United States Patent [19]
Fujita et al.

[11] Patent Number: 4,789,607
[45] Date of Patent: Dec. 6, 1988

[54] ALUMINUM BEARING ALLOY AND TWO-LAYER BEARING MATERIAL HAVING BEARING LAYER OF ALUMINUM BEARING ALLOY THEREIN

[75] Inventors: Masahito Fujita; Akira Ohgawara; Takeshi Sakai; Toshinaga Ohgaki; Tsuyoshi Ohsaki, all of Chiba, Japan

[73] Assignee: NDC Company, Ltd., Chiba, Japan

[21] Appl. No.: 906,009

[22] Filed: Sep. 11, 1986

[30] Foreign Application Priority Data

Sep. 13, 1985 [JP] Japan ................... 60-202942
Mar. 18, 1986 [JP] Japan ................... 61-61096

[51] Int. Cl.$^4$ .............. C22C 21/00; C22C 21/02; B32B 15/20
[52] U.S. Cl. ..................... 428/653; 428/687; 420/528; 420/548; 420/554
[58] Field of Search ............... 428/653, 687, 614; 148/415, 416, 417, 418; 420/552, 554, 528, 544, 537, 530, 546, 548-549; 308/DIG. 8

[56] References Cited

U.S. PATENT DOCUMENTS

| | | | |
|---|---|---|---|
| 4,340,649 | 7/1982 | Nara et al. | 428/653 |
| 4,409,036 | 10/1983 | Vernam et al. | 148/415 |
| 4,471,032 | 9/1984 | Fukuoka et al. | 148/415 |
| 4,471,033 | 9/1984 | Fukuoka et al. | 148/415 |

Primary Examiner—John J. Zimmerman
Attorney, Agent, or Firm—Sughrue, Mion, Zinn, Macpeak and Seas

[57] ABSTRACT

This invention relates to Al bearing alloy and a two-layer bearing material consisting of a bearing layer of said Al bearing alloy and a backing metal consisting of a steel sheet or the like. More particularly, the invention concerns an Al bearing alloy, which contains an aluminum alloy matrix having 2 to 35% of Sn, 0.5 to 10%, of Si, 0.1 to 10% of Pb, 0.01 to 0.3% of Sr and 0.01 to 0.3% of Sb, the balance being substantially Al. Additional constitutents may be 0.1 to 4% in total of at least one member selected from the group consisting of Cu, Mg, Zn, Cr, Mn, Fe, Ni, Co, Mo, Ti, V and Zr. The Si is precipitated as Si precipitate particles having spherical or oval shape or a shape having rounded ends in an Al matrix consisting substantially of Al and also Sn-Pb alloy particles are precipitated in the vicinity of the Si precipitate in the Al matrix so that it has improved fatigue-resistant properties, anti-seizure properties and abrasion-resistant properties under high speed, high load running conditions of the automobile.

4 Claims, 3 Drawing Sheets

ALUMINUM BEARING ALLOY AND TWO-LAYER BEARING MATERIAL HAVING BEARING LAYER OF ALUMINUM BEARING ALLOY THEREIN

BACKGROUND OF THE INVENTION (1) Field of the Invention

This invention relates to a two-layer Al bearing material consisting of an Al bearing alloy layer and a backing metal consisting of a steel sheet or the like. More particularly, the invention concerns an Al bearing alloy, which contains Sn and Pb as well as Si, and in which Si is precipitated as Si precipitate particles having spherical or nearly spherical shape in an Al matrix and also Sn-Pb alloy particles are precipitated in the vicinity of the Si precipitate so that it has improved fatigue-resistant property, anti-seizure property and abrasion-resistant property under high speed, high load running conditions of the automobile, and also a bearing material consisting of the Al bearing alloy and backing metal.

(2) Prior Art

Recently, there are trends for smaller size, lighter weight, lower fuel consumption and higher output of automobile engines. Therefore, the bearing should bear increased load, and also the operating temperature of lubricant is increased. The operating conditions of the bearing thus are becoming increasingly stringent.

Generally, the bearing has a three-layer structure consisting of a backing metal formed from a steel plate or the like, an Al bearing alloy layer formed on the backing metal and a bearing layer formed by means of overlay plating on the Al bearing alloy layer. The bearing of this three-layer structure consisting of the backing metal, bearing alloy layer and overlay plating bearing layer, however, is subject to fatigue or seizure due to temperature elevation of the bearing surface, so that it can not meet the stringent operating conditions noted above. Accordingly, there has recently been a demand for a bearing having a two-layer structure, which does not have any surface bearing layer of overlay plating but supports an engine shaft with a bearing alloy layer formed on a backing metal. At present, however, a bearing having stable performance can not be obtained even by adopting the two-layer bearing structure because Al bearing alloys that have been developed so far can insufficiently meet the stringent operating conditions noted above.

More specifically, in the three-layer bearing having a surface bearing layer formed by overlay plating the intermediate bearing alloy layer consists of such an Al bearing alloy as JIS (Japanese Industrial Standards) H 5402, AJ-1 (10% Sn, 0.75% Cu, 0.5% Ni, Al as balance), or JIS H 5402, AJ-2 (6% Sn, 2.5% Cu, 1.0% Ni, Al as balance) or such Al bearing alloy as SAE 780 (6% Sn, 2% Si, 1% Cu, 0.5% Ni, 0.1% Ti, Al as balance), and its Sn content is comparatively small, typically 10 to 6%. For this reason, a Pb-Sn alloy layer is formed as surface bearing layer by overlay plating.

However, under recent high load, high temperature operating conditions, the surface bearing layer is worn out to result in seizure so that it can no longer withstand use in a comparatively short period of time. With the two-layer bearing having overlay plating layer as surface bearing layer, on the other hand, the bearing alloy layer is, for instance, SAE 783 (20% Sn, 0.5% Si, 1.0% Cu, 0.1% Ti, Al as balance) or like Al alloys with as high Sn content as 20%. Since the Sn content is high, however, the hardness is reduced, and the Al matrix is fragile, so that the bearing can not withstand high load.

In "Jiku-uke Gokin" (Bearing Alloys) by Koichi Mizuno, published by Nikkan Kogyo Shinbun Sha, issued in 1954, pp. 139 it is disclosed to form a bearing alloy layer from a bearing alloy, which has enhanced anti-seizure property provided by increasing the lubrication property with addition of Pb together with Sn. This bearing alloy contains 10% of Sn, 1.5% of Cu and 0.5% of Si and also 3% of Pb. Therefore, it can not withstand the high load as noted above although the lubrication property can be improved to some extent.

An Al alloy which contains Sb incorporated to improve the dispersion of Pb which hardly forms a solid solution with Al, is disclosed in Japanese Patent Publication No. 121,131/1977. Further, an Al alloys containing Cr added for Al matrix reinforcement and also for preventing coarse Sn particles are disclosed in Japanese Patent Publication No. 18,985/1983. These Al alloys, however, have been developed for the purpose of improving the lubrication property under ordinary running conditions, and they do not exhibit sufficient antifatigue property under high load running conditions, under which the lubrication mechanism is quite different from that under the ordinary running conditions.

To meet the lubrication mechanism under high load running conditions, there has been proposed a bearing alloy, which is obtained by adding a large quantity of, e.g., 11% or above, of Si to a Sn-containing Al alloy so that it has dispersed Si precipitates which are coarse in grain and have power.

This bearing alloy is imparted with forging property and creep property by the addition of a large quantity of Si. In addition, the cutting force provided by hard Si precipitate particles has an effect of removing irregularities of the counterpart rotary shaft surface to provide a smooth surface, thus improving the performance of the bearing. More specifically, the surface of a rotary shaft made of spherical graphite cast iron or the like has depressions, which result from detachment of graphite particles at the time of polishing, and raised portions such as burrs or edges formed around the recesses. Under high load running conditions, the surface of the bearing alloy layer is ground by such recesses and raised positions of the rotary shaft, thus resulting in abnormal wear of the bearing. With the bearing alloy having dispersed Si precipitate particles the raised portions of the shaft surface are cut away by the hard Si precipitate particles, thus preventing abnormal wear or seizure.

In order to cut the counterpart shaft surface with the Si precipitates to improve the anti-seizure property, it is necessary to add as large amount of Si as 11% or above. The addition of such large amount of Si, however, rather leads to damage to the shaft surface because of precipitation of coarse Si particles. It also leads to cause seizure and deterioration of the cutting or like machining property because of lack of ductilities of the alloy, which is a serious problem. To cope with these problem there has been proposed a bearing alloy, in which the Si content is reduced to be less than 11%, particularly to 0.2 to 5%, as disclosed in Japanese Patent Publication No. 6.955/1983. With this bearing alloy, however, it is impossible to attain improvement of the anti-seizure property due to cutting force of Si precipitates as noted above under high load running conditions, and an improvement in this respect has been called for.

SUMMARY OF THE INVENTION

According to the invention, there is provided an Al bearing material alloy, which contains 3 to 35% of Sn, 0.5 to 10% of Si and 0.1 to 10% of Pb and also contains at least one member of a group consisting of 0.01 to 0.3% of Sr and 0.01 to 0.3% of Sb, the balance being Al, and in which at least one part of Si is dispersedly precipitated as Si precipitate particles in the aluminum matrix substantially consisting of Al. In this bearing alloy, each Si precipitate particle is precipitated as a Si precipitate particle having a spherical or oval shape, and also provided with a rounded upper end portion projecting from the surface of the Al matrix consisting of Al. In addition, Sn-Pb alloy precipitate particles exist adjacent to each Si precipitate particle, Sn-Pb alloy precipitate particles being melted to form a liquid phase supplied onto the surface of the rounded projecting upper portion of Si precipitate particle.

DESCRIPTION OF THE PREFERRED EMBODIMENT

Figure 1:
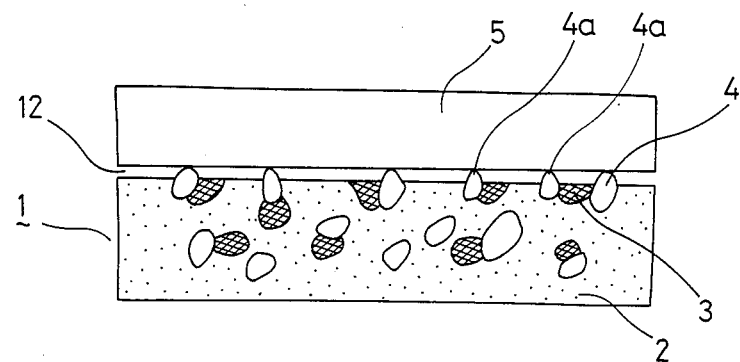
FIG. 1 is a fragmentary enlarged-scale sectional view showing an embodiment of the bearing material and a part of rotary shaft of bearing mechanism according to the invention.

Referring to FIG. 1, reference numeral 1 designates a bearing alloy according to the invention. The bearing alloy 1 is a casting Al alloy containing 3 to 35% of Sn, 0.1 to 10% of Pb and 0.5 to 10% of Si, the balance being substantially Al. This alloy has Al matrix 2 mainly composed of Al (hereinafter referred to as matrix). In the alloy, Si is partly or totally precipitated to form Si precipitate particles 4, while Sn and Pb are precipitated in the Al matrix 2 to form an Sn-Pb alloy precipitate, particle 3, in the neighborhood of each Si precipitate particle 4. Each Si precipitate particle 4 has a spherical or nearly spherical shape and a rounded upper end 4a projecting from the surface of matrix 2. With the alloy having this structure, a rotary shaft 5 which is supported by the surface of this alloy is actually supported by rounded upper ends 4a of nearly spherical Si particle 4. This support thus is the ideal point contact support, so that the lubrication property and fatigue-resistant property can be enhanced to prevent the surface temperature from increasing. Additionally, when there occurs a temperature elevation between a surface of the bearing alloy 1 and rotary shaft 5, due to breakage of lubricant film on the upper ends 4a of Si precipitate particles 4, the Sn-Pb alloy particle 3 is at least partly melted to form a liquid phase and the liquid phase is supplied onto the upper ends 4a of Si precipitate particles 4, thereby protecting from the occurrence of seizure. Besides, with the spherical shape of the Si precipitate particle 4 mainly the tenacity of the Al matrix can be improved in the structural aspect.

In order to improve the sole anti-fatigue property under a high temperature condition, it may be thought to add such high-melting elements as Cr, Co and Ni to increase the high temperature strength and prevent sharp reduction of the hardness with temperature rise. While the hardness of the alloy can be increased by adding these high-melting elements, the alloy in this case becomes fragile, that is, the tenacity thereof is reduced to reduce impact value and elongation. To solve this problem, according to the invention at least one member of a group consisting of Sr and Sb is added to alloy containing Si as well as Sn and Pb. The added Sr and/or Sb control the liquid phase of Al alloy at the time of the solidification and permit precipitation of Si in a spherical form. It is thus possible, if desired, to enhance the roundness of the Si precipitate even where heat treatment is conducted under ordinary heat treatment conditions, thus obtaining increase of tensile strength, elongation and impact strength of Al-Sn matrixes.

A more detailed discussion will be given in this connection. The anti-fatigue strength of material depends on the tensile strength, elongation impact strength and structure of the material, and problems in this connection can not be solved by merely adding a high-melting element as in the prior art case. The inventors have conducted extensive researches and investigations in this connection. They have found that the addition of 0.01 to 0.3% of Sr or 0.01 to 0.3% of Sb permits precipitation of Si in spherical shape to greatly improve the mechanical properties such as tensile strength, elongation and impact strength of the Al matrix just like spherical graphite cast iron has greatly improved mechanical properties compared to flaky graphite cast iron. This feature is supported by the fact that improvement of the fatigue strength is recognized as a result of fatigue tests under high temperature, high load conditions.

Further, the spherical shape of the Si precipitate 4 is improved such that the surface structure of the bearing surface meets the high temperature, high load conditions. This permits extreme improvement of the surface performance, i.e., anti-seizure property and lubrication property.

Figure 2:
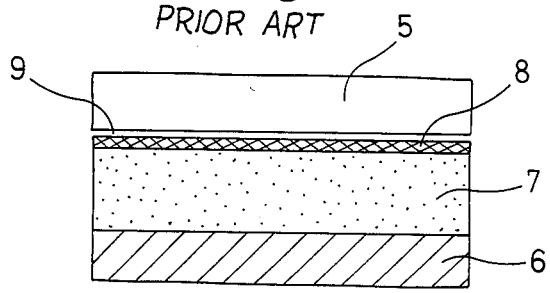
FIG. 2 is a fragmentary enlarged-scale sectional view illustrating a state of lubrication of a prior art three-layer structure bearing material.

The phenomenon of seizure usually takes place through a complicated process and due to a combination of a large number of different factors. Therefore, a precise explanation of the phenomenon is difficult. In prior art bearing material having a three-layer structure, as shown in FIG. 2, there is provided a surface bearing layer of a Pb-Sn alloy or the like formed by overlay plating, but the bearing layer wears out to result in the occurrence of seizure at high temperature, high load running conditions. On the contrary, seizure frequently does not occur in the prior art bearing material having a two-layer structure, as shown in FIG. 3, which bearing material is made of an Al alloy and contains Si precipitate particles, without any surface overlay plating bearing layer.

Figure 3:
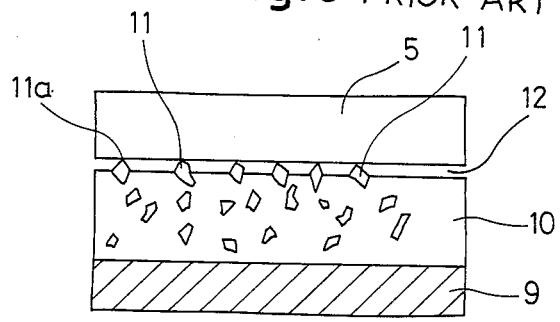
FIG. 3 is a fragmentary enlarged-scale sectional view showing a prior art two-layer structure bearing material having Si precipitate particles therein and a part of a counter-part shaft of bearing mechanism.

The inventors have noted this fact and made structural comparative study of both the prior art bearing materials shown in FIGS. 2 and 3. FIG. 2 is a fragmentary enlarged-scale sectional view showing the three-layer structure bearing material. Referring to the Figure, the material comprises a backing metal 6 made from a sheet or the like, a bearing alloy layer 7 formed on the backing metal 6 and a bearing layer 8 formed by overlay plating on the bearing alloy layer 7. On the contrary, FIG. 3 is a fragmentary enlarged scale sectional view showing a two layer bearing material including Si precipitate particles. More specifically, this material comprises a backinig material 9 made from a steel sheet and an Al bearing alloy layer 10 having an Al matrix therein. This material is free from any overlay plating bearing layer.

With the three-layer bearing material of FIG. 2, the load of rotary shaft 5 is supported by the entire surface of the overlay plating bearing layer 8. There exists lubricant in a gap 9 between the rotary shaft 5 and the bearing layer 8 formed on the bearing alloy layer 7, so that the bearing layer 8 and the rotary shaft 5 is supported by the lubricant. On the other hand, with the two-layer structure bearing material of FIG. 3, Si is precipitated as Si precipitate particles 11 having a rod-like or flaky shape in the bearing alloy layer 10, and the shaft 5 is supported by upper edge 11a of each Si precipitate particle 11.

In other words, with the two-layer bearing material shown in FIG. 2, where the shaft load is supported by the bearing layer 8, via the lubricant existing in gap 9, the temperature of the frictional surface is quickly elevated under high speed, high load conditions, so that the bearing layer 8 of a Pb-Sn alloy, for instance, is worn out. In this case, if the lubrication property of the bearing alloy layer 7 is inferior to that of the surface bearing layer 8, the lubrication property is quickly reduced to result in the occurrence of seizure. On the other hand, with the two-layer bearing material shown in FIG. 3, the shaft load is supported by the upper edge 11a of each Si precipitate particle 11. Therefore, a slight gap 12 is formed between the surface of the bearing alloy layer 10 and the surface of the rotary shaft 5, while a lubricant film exists in the gap 12. The load of shaft 5 is not directly applied to the lubricant film existing in the gap 12, which is maintained by each Si precipitate particle 11. Accordingly, breakage of the lubricant film does not occur under high load.

As discussed above, with the two-layer bearing material shown in FIG. 3, the load of the shaft 5 can be supported by the Si precipitate particles 11 having upper edges 11a in contact with the surface of the shaft 5. However, with the two-layer bearing material of FIG. 2, the Si precipitate particles 11 are flaky or rod-like and have pointed edges 11a, which will rather cause scars and scratches on the surface of the shaft 5. Further, if the Si precipitate particles 11 are excessive, machining property is deteriorated.

In detail, the reason why conventional bearing material shown in FIG. 3 has excellent bearing performance in comparison with that shown in FIG. 2 is as follows.

With the bearing material of FIG. 3, the counter-part shaft 5 is support by means of Si precipitate particles 11 having their edges 11a in a direct contact with the surface of the shaft 5. Also, there does not occur any chemical reaction between these contacting edges 11a and the shaft surface, or any dissolution of these contacting edges 11a in case of these edges 11a contacting with the shaft surface at a temperature of from 200° C. to 500° C. This is because each Si precipitate particle 11 is a non-metallic substance having a high melting temperature, a high hardness of 599 (Vickers hardness) and excellent elasticity.

On the contrary, with the bearing material shown in FIG. 2, the bearing layer 8 supporting the counter-part shaft 5 comprises a high Sn containing Al alloy having a low melting point, such as S A E (20% Sn, 0.5% Si, 1.0% Cu, 0.1% Ti, Al balance), and with such Al alloy a reduction of hardness occurs at elevated temperature. Therefore, at least slight dissolution or wear-out takes place on the bearing layer 8, in case of the bearing layer 8 contacting the shaft surface at a temperature of from 200° to 500° C. Summing-up, the bearing material shown in FIG. 3 has excellent bearing performance under high temperature, high load conditions, compared to the bearing material shown in FIG. 2.

However, in the bearing material of FIG. 3 Si is precipitated as Si precipitate particles 11 having a plate-like or rod-like shape, even in the case when Si is in eutectic precipitate with Al. This is because Si exhibits a strong trend to crystallization in itself and the shape of the Si precipitate particles 11 undergo only a slight change even when rolling and heat treatment are performed during manufacture of the bearing material.

From the above reason, with the bearing material of FIG. 3, the surface of the counter-part shaft 5 is cut and damaged by the pointed edges 11a of Si precipitate particles 11.

Figure 4:
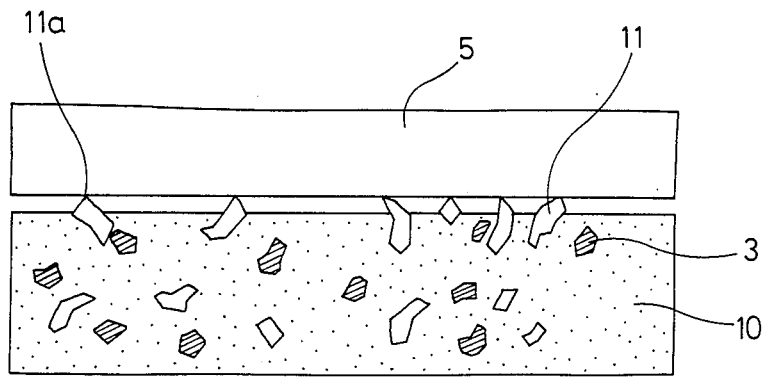
FIG. 4 is a fragmentary enlarged-scale sectional view illustrating a state of lublication of the bearing material of the prior art shown in FIG. 3.

Furthermore, in the bearing material of FIG. 3, Sn-Pb alloy precipitate particles are precipitated at positions spaced from Si precipitate particles, as shown in FIG. 4, respectively. There does not occur such a phenomenon that Sn-Pb alloy liquid obtained by a particle melting of Sn-Pb precipitate particle 3 is supplied onto the pointed edge 11a of Si precipitate particle 11, because Si precipitate particles 3 does not exist in neighborhood of Sn-Pb alloy particle 3, as shown in FIG. 4. Accordingly, when the above cutting by these pointed edges 11a proceeds, seizure eventually results.

For the above reason, according to the invention, owing to removing the cutting force of the Si precipitate particle, the shape of the Si precipitate particle is controlled such as to provide for roundness of shape of the Si precipitate particles, e.g., spherical shape thereof. At the same time, Sn-Pb alloy precipitate particles are dispersed in the neighborhood of the Si precipitate particles.

More specifically, according to the invention, Si precipitate particles 4 are dispersed in the Al matrix 2 as shown in FIG. 1, while the shape of the Si precipitate particles 4 are rendered to be spherical by the addition of Sr and/or Sb. Thus, the rotary shaft 5 is supported by the spherical Si to the surface of the rotary shaft 5 even if the bearing experiences suddenly changing loads.

Further, since the Si precipitate particle 4 is found as spherical particles in the Al matrix 2, there will occur no notch effect. Thus, it is possible to obtain a matrix having a stable mechanical strength and excellent abrasion-resistant property.

The spherical shape of the Si precipitate particles 4 can be attained by improving the character of the Al alloy liquid phase at the eutectic point, at which Si is precipitated. Particularly, effective improvement of the character of the Al alloy liquid phase can be obtained by adding at least one member of a group consisting of 0.01 to 0.3% of Sr and 0.01 to 0.3% of Sb.

More specifically, by adding Sr and Sb in the ranges noted above, the dispersion of the Si precipitate particles 4 is improved, and also spherical shape of Si precipitate particles 4 can be obtained. Further, the status of precipitation of Sn-Pb alloy particles 3 is changed, that the Sn-Pb alloy precipitate particles 3 are found to exist closer closer to the spherical Si precipitate particles 4, as shown in FIGS. 1 and 5.

Figure 5:
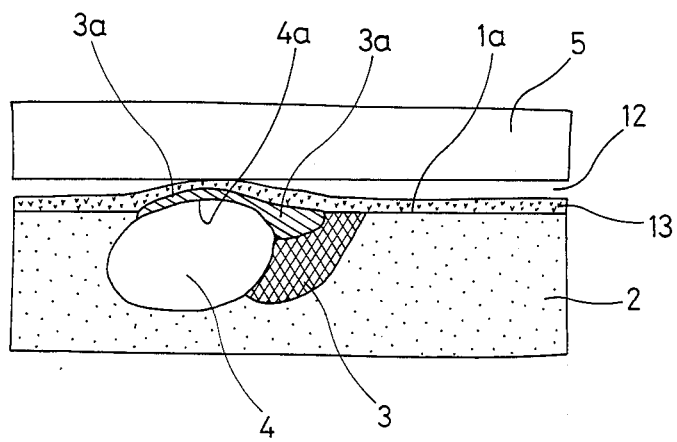
FIG. 5 is a fragmentary enlarged-scale sectional view illustrating a state of lublication of the bearing material art according to the invention, shown in FIG. 1.

FIG. 5 shows an enlarged-scale sectional view of the surface of the bearing alloy layer of the surface of the bearing material having the structure as shown in FIG. 1. The shaft load is supported by end portions 4a of Si precipitate particles 4 projecting from the surface of the Al matrix 2. In addition, there exists a lubricant film 13 between the surface 1a of bearing alloy layer 1 and rotary shaft 5 (see FIG. 1). Thus, fluid lubrication is maintained. Further, the Sn-Pb alloy particles 3 are present in the neighborhood of the Si precipitate particle 4. The Sn-Pb alloy has a strong affinity with the lubricant of the lubricant film 13. Therefore, breakage of the lubricant film at the end portions 4a of precipitate particles 4 occurs with difficulty. Further, even when the Si precipitate particle 4 is elevated in temperature due to its friction with the rotary shaft 5, the heat can be absorbed as heat of melting of the Sn-Pb alloy precipitate particles 3, so that there occurs less seizure between the neighboring Al matrix 2, and rotary shaft 5. Further, even if the Sn-Pb alloy particle 4 adjacent to the Si precipitate particle 4 as shown in FIG. 5 is at least partly in liquid phase, this liquid phase 3a is supplied to the projecting surface 4a of the Si precipitate particle 4 to keep the lubrication. The amount of the liquid phase 3a supplied is increased with temperature-rise under the boundary lubrication state, and the Sn-Pb liquid phase 3a is present on the surface 4a of the Si precipitate particle 4 at all time, so that the lubrication can be kept and it is possible to prevent the rotary shaft 5 and Al matrix 2 from adhering to one another. The structure, in which the Si precipitate particles 4 are spherical and Sn-Pb alloy particles 3 are close to the Si precipitate particle 4, is extremely effective in the boundary lubrication state (i.e., a state of absence of lubricant film 13). Further, even in the ordinary fluid lubrication state the hard Si precipitate particle 4 adequately adopts itself to the rotary shaft 5, and the Si precipitate particle 4 is adjacent to soft Sn-Pb precipitate particles 3 which serves as shock absorber.

Further, it is preferred to enhance the mechanical strength of the matrix at high temperature in addition to improving the bearing alloy layer surface performance. More specifically, Al as main component of the Al matrix do not endure high temperature, and when the temperature exceeds 150° C., it is softened (with Hv becoming 10 or below), and it mechanical strength is lost. As Al matrix reinforcement element of precipitation hardening type, Cu, Mg, Zn, Mn, Fe, Co, Ni, Mo, Ti, V, Zr, etc. are added. If one or more of these reinforcement elements are selected, and appropriate heat treatment is performed, the mechanical strength at high temperature can be further increased. The adequate total amount of these additional elements is 0.1 to 4%. When the elements are added in this range, they will impart the bearing with an anti-fatigue property. Addition of elements in excess of this range will result in size increase of the precipitate, and the tenacity is deteriorated.

The reasons for the limitation to the content of the components in the bearing alloy layer are follows.

(1) Sn to 3 to 35%:

Sn is present in a dispersed state in the Al matrix and provides for anti-seizure property which is basic properties required for the bearing material. Pb also helps to enhance a possibility that obstacles such as dust, dirt, etc. bury into the bearing surface, resulting in improving the lubrication performance between the bearing surface and rotary shaft. In addition, it is alloyed with Pb to be precipitated as Pn-Pb alloy particles to attain the above effect. However, when its content is less than 3%, the anti-seizure property and other properties, e.g., precipitation of Sn-Pb particles in the vicinity of the Si precipitate, which is attributable to the addition of Sr or Sb according to the invention, can not be obtained. When its content exceeds 35%, on the other hand, the mechanical strength of the Al matrix is deteriorated, even by adding the Al matrix reinforcement elements according to the invention.

(2) Pb to 1 to 10%:

Pb helps to improve the anti-seizure property, affinity to oil and agglomeration-free property. Pb also helps to enhance a possibility that obstacles such as dust, dirt, etc. bury into the bearing surface, resulting in improving the lubrication performance between the bearing surface and rotary shaft. It is alloyed with Sn to be precipitated as Sn-Pb alloy particles to provide the effects noted above, thus outstandingly improving the lubrication performance. Its content should be determined in relation to the content of Sn. When the Sn content is 3%, at least 0.1% of Pb is necessary. However, when Pb is added in excess of 10%, it frequently fails to form solid solution with Sn but is precipitated alone. In this case, it is practically impossible to obtain uniform dispersion of Pb for Pb will not form solid solution with Al.

(3) Si to 0.5 to 10%:

Si is precipitated as Si precipitate as noted above, and it is an important element in that is provides for anti-seizure property, load resistance and abrasion-resistant property. However, when its content is less than 1%, improvement of the mechanical characteristics of alloy due to provision of the spherical shape of the Si precipitate or improvement of the lubrication property can not be recognized. When its content is above 10%, on the other hand, it is difficult to provide for the spherical shape of its precipitate particles even by adding Sr or Sb. Rather, large size plate-like or rod-like precipitate particles are increased. In this case, the hardness of the Al matrix is increased, and the ductility and machining property are lost. The processing property of the bearing material is deteriorated, and the anti-fatigue property is deteriorated due to extreme hardening of the bearing alloy. Thus, the load resistance is rather deteriorated.

(4) One or more members of a group consisting of Cu, Mg, Zn, Cr, Mn, Fe, Ni, Co, Ti, V and Zr to 0.1 to 4% in total:

Cu, Mg and Zn are basic Al matrix reinforcement elements, and their effect can be obtained by appropriate heat treatment. If their content is less than 0.1%, no effect of addition can be obtained. If their content exceeds 4%, on the other hand, they form compounds with Al, so that they rather deteriorates the ductility of the material.

Cr, Mn, Fe, Ni, Co, Ti, V and Zr form compounds with Al. The hardness and mechanical strength of the Al matrix can be increased by slightly adding it. These elements can substitute for part of Cu, Mg and Zn.

Further, the anti-fatigue property, abrasion-resistant property and mechanical strength at high temperature can be improved by adding them in adequate amounts. Their suitable amount is 0.01 to 1.0% when Cu, Mg and Zn are 0.3 to 3%. If the amount is above 1%, the size of compound particles is increased. In this case, the mechanical strength of the alloy is rather reduced.

(5) Sr to 0.01 to 0.3% or Sb to 0.01 to 0.3%:

Sr and Sb cause dispersed precipitation of Si as precipitate particles having spherical or oval shape or a shape with round ends. This effect can be obtained when either one of these elements is added, but the effect can be enhanced when both the elements are added together. To obtain this effect, most preferably the content of Sr is 0.01 to 0.3% or the content of Sb is 0.01 to 0.3%. When Sr or Sb is less than 0.01%, it will have no influence on the shape of the Si particles. When Sr or Sb are added by more than 0.3%, spherical shape of Si precipitate can no longer be obtained. Besides, Sb is precipitated in the Sn phase as a compound so that it is not useful for the improvement of the Si precipitate shape. When the Sr content exceeds 0.3%, a gas absorption takes place to form nestles during the forging.

Examples of the invention are given below.

EXAMPLE 1

Al bearing alloys having compositions shown in Table 1 were used for continuously forging plates with a thickness of 20 mm. The upper and lower surfaces of each billet forged were cut away by 0.1 mm, followed by cold rolling to a thickness of 2 mm. The resultant sheet was heated to 300° to 350° C. and then cooled down, thus obtaining a bearing alloy layer. The bearing alloy layer was then press bonded to a steel sheet base member via a thin Al sheet, thus obtaining a bearing material 1.50 mm in thickness and having a two-layer structure consisting of backing metal and bearing alloy layer. The thin Al sheet was used for bonding the steel sheet and bearing alloy layer to each other. Similar press bond could be obtained by forming an Al plating sheet in lieu of the thin Ni on the surface of the backing metal.

Of the bearings Samples No. 1 to No. 5 were contrast samples not containing Sr. Sample No. 4 contained a great amount, e.g., 0.8%, of Sb. Samples No. 6 to No. 49 were according to the invention. Among these samples, Samples No. 19, No. 26, No. 27, No. 31 and No. 33 contained both Sr and Sb to provide for spherical shape of the Si precipitate. Samples No. 35 to No. 49 contained only Sb to the same end. Samples No. 7 to No. 12 further contained Cu, Mg and Zn. Samples No. 13 to No. 19 contained Cr, Mn, Fe, Co, Ni, Mo and Sb, respectively, these elements being added to the composition of Sample No. 6. Further, these samples slightly contained Ti added to the end of crystal grain size reduction. Samples No. 20 to No. 34 contained suitable combinations of these additive elements. Samples No. 35 to No. 41 contained Sb added for providing for spherical shape of Si particles and also contained Cu added for enhancing the mechanical strength of the Al matrix. These samples also contained Cr, Mn, Fe, Co and Ni, respectively, and also slightly contained Ti added for crystal grain size reduction. Samples No. 43 to No. 49 contained suitable combinations of these additive elements.

To examine mechanical characteristics of these samples at normal temperature and 200° C. as operating temperature condition, tensile strength test, elongation test and hardness test were conducted on these samples. The results are shown in Table 2. For the tests, the backing metal was removed from each sample by machining, that is, the sole Al bearing alloy layer was tested. The shape of the test piece conformed to Item 5 of JIS Z 2201.

TABLE 1

| Sample No. | Composition (in % by weight), the balance being Al ||||||||||||||||
|---|---|---|---|---|---|---|---|---|---|---|---|---|---|---|---|---|
| | Sn | Pb | Si | Sr | Cu | Mg | Zn | Cr | Mn | Fe | Co | Ni | Mo | Sb | Ti | V | Zr |
| 1 | 15 | 2.0 | 2.5 | | | | | | | | | | | | | | |
| 2 | 15 | 2.0 | 2.5 | | 0.7 | | | | | | | | | | | | |
| 3 | 15 | 1.7 | 2.0 | | 0.7 | | 0.4 | | | | | | | | | | |
| 4 | 13 | 1.7 | 2.5 | | 0.7 | | | | | | | | | 0.8 | | | |
| 5 | 13 | 2.0 | 2.0 | | 0.7 | 0.5 | | 0.3 | 0.4 | | | 0.4 | | | | | |
| 6 | 13 | 2.0 | 3.0 | 0.03 | | | | | | | | | | | | | |
| 7 | 13 | 2.0 | 3.0 | 0.03 | 0.7 | | | | | | | | | | | | |
| 8 | 13 | 2.0 | 3.0 | 0.03 | | 0.5 | | | | | | | | | | | |
| 9 | 13 | 2.0 | 3.0 | 0.03 | | | 3.0 | | | | | | | | | | |
| 10 | 13 | 2.0 | 3.0 | 0.03 | 0.7 | 0.5 | | | | | | | | | | | |
| 11 | 13 | 2.0 | 3.0 | 0.03 | 0.7 | | 3.0 | | | | | | | | | | |
| 12 | 13 | 2.0 | 3.0 | 0.03 | 0.7 | 0.5 | 2.5 | | | | | | | | | | |
| 13 | 13 | 2.0 | 3.0 | 0.20 | | | | 0.3 | | | | | | | 0.05 | | |
| 14 | 13 | 2.0 | 3.0 | 0.15 | | | | | 0.4 | | | | | | 0.05 | | |
| 15 | 13 | 2.0 | 3.0 | 0.15 | | | | | | 0.3 | | | | | 0.05 | | |
| 16 | 13 | 2.0 | 3.0 | 0.10 | | | | | | | 0.5 | | | | 0.05 | | |
| 17 | 13 | 2.0 | 3.0 | 0.10 | | | | | | | | 0.4 | | | 0.05 | | |
| 18 | 13 | 2.0 | 3.0 | 0.02 | | | | | | | | | 0.5 | | 0.05 | | |
| 19 | 13 | 2.0 | 3.0 | 0.02 | | | | | | | | | | 0.2 | 0.05 | | |
| 20 | 13 | 2.0 | 3.0 | 0.03 | 0.7 | | 0.3 | | 0.4 | | | | | | 0.05 | | |
| 21 | 13 | 2.0 | 3.0 | 0.03 | 0.7 | | | | 0.4 | | | | | | 0.05 | | |
| 22 | 13 | 2.0 | 3.0 | 0.03 | 0.7 | | | | | 0.3 | | | | | 0.05 | | |
| 23 | 13 | 2.0 | 3.0 | 0.03 | 0.7 | | | | | | 0.5 | | | | 0.05 | | |
| 24 | 13 | 2.0 | 3.0 | 0.03 | 0.7 | | | | | | | 0.4 | | | 0.05 | | |
| 25 | 13 | 2.0 | 3.0 | 0.03 | 0.7 | | | | | | | | 0.5 | | 0.05 | | |
| 26 | 13 | 2.0 | 3.0 | 0.03 | 0.7 | | | | | | | | | 0.05 | 0.05 | | |
| 27 | 13 | 2.0 | 3.0 | 0.03 | 0.7 | 0.5 | 0.3 | | | | | | | 0.04 | 0.05 | | |
| 28 | 13 | 2.0 | 3.0 | 0.03 | 0.7 | 0.5 | | 0.4 | | | | | | | | | 0.05 |
| 29 | 13 | 2.0 | 3.0 | 0.03 | 0.7 | | | | 0.3 | | | | | | | 0.1 | |
| 30 | 13 | 2.0 | 3.0 | 0.03 | 0.7 | | | | 0.4 | | | 0.3 | | 0.03 | | | 0.05 |
| 31 | 13 | 2.0 | 3.0 | 0.03 | 0.7 | 0.5 | | | 0.4 | | | | 0.05 | 0.03 | 0.1 | | |
| 32 | 13 | 2.0 | 3.0 | 0.03 | 0.7 | | | | 0.4 | | | | 0.3 | 0.03 | | | |

TABLE 1-continued

Composition of samples

| Sample No. | Sn | Pb | Si | Sr | Cu | Mg | Zn | Cr | Mn | Fe | Co | Ni | Mo | Sb | Ti | V | Zr |
|---|---|---|---|---|---|---|---|---|---|---|---|---|---|---|---|---|---|
| 33 | 13 | 2.0 | 3.0 | 0.03 | 0.7 | | | | 0.3 | | | | | 0.03 | | | |
| 34 | 13 | 2.0 | 3.0 | 0.03 | 0.7 | | 0.3 | | | | | | | 0.30 | 0.05 | | |
| 35 | 13 | 2.0 | 3.0 | | 0.7 | | 0.3 | | | | | | | 0.20 | 0.05 | | |
| 36 | 13 | 2.0 | 3.0 | | 0.7 | | | | 0.4 | | | | | 0.15 | 0.05 | | |
| 37 | 13 | 2.0 | 3.0 | | 0.7 | | | | 0.3 | | | | | 0.15 | 0.05 | | |
| 38 | 13 | 2.0 | 3.0 | | 0.7 | | | | | | 0.5 | | | 0.15 | 0.05 | | |
| 39 | 13 | 2.0 | 3.0 | | 0.7 | | | | | | | 0.4 | | 0.10 | 0.05 | | |
| 40 | 13 | 2.0 | 3.0 | | 0.7 | | | | | | | | | 0.02 | 0.05 | | |
| 41 | 13 | 2.0 | 3.0 | | 0.7 | | | | | | | | | 0.02 | 0.05 | | |
| 42 | 13 | 2.0 | 3.0 | | 0.7 | 0.5 | | 0.3 | | | | | | 0.03 | 0.05 | | |
| 43 | 13 | 2.0 | 3.0 | | 0.7 | 0.5 | | | 0.4 | | | | | 0.03 | | | 0.05 |
| 44 | 13 | 2.0 | 3.0 | | 0.7 | | | | | 0.3 | | | | 0.03 | | 0.1 | |
| 45 | 13 | 2.0 | 3.0 | | 0.7 | | 2.0 | | 0.4 | | | | | 0.03 | 0.03 | | 0.05 |
| 46 | 13 | 2.0 | 3.0 | | 0.7 | 0.5 | | | 0.4 | | | | | 0.03 | 0.03 | 0.1 | |
| 47 | 13 | 2.0 | 3.0 | | 0.7 | | | | 0.4 | | | | | 0.03 | 0.03 | | |
| 48 | 13 | 2.0 | 3.0 | | 0.7 | | | | | 0.3 | | | | 0.03 | | | |
| 49 | 13 | 2.0 | 3.0 | | 0.7 | 0.5 | | 0.3 | 0.4 | | | 0.4 | | 0.03 | | | |

TABLE 2

Mechanical characteristics and bearing performance of samples

| | Material characteristics | | | | | | Bearing performance | | | |
|---|---|---|---|---|---|---|---|---|---|---|
| | Hardness (in Hv) | | Tensile strength (in kg/mm$^2$) | | Elongation (in %) | | Anti-seizure property (kg/cm$^2$) | Abrasion-resistant property (mg) | Anti-fatigue property (Hrs) | |
| Sample No. | Normal temperature | 200° C. | Normal temperature | 200° C. | Normal temperature | 200° C. | | | | Remarks |
| 1 | 32.0 | 10.0 | 9.5 | 4.0 | 22.0 | 21.0 | 120 | 2.5 | 95 | |
| 2 | 35.0 | 12.0 | 10.0 | 4.8 | 18.0 | 18.5 | 125 | 2.5 | 120 | |
| 3 | 39.5 | 19.0 | 12.0 | 5.0 | 8.5 | 15.2 | 150 | 2.3 | 150 | Contrast samples |
| 4 | 41.1 | 18.5 | 11.8 | 5.1 | 17.7 | 17.0 | 145 | 2.3 | 150 | |
| 5 | 43.8 | 20.5 | 12.0 | 5.2 | 14.0 | 14.7 | 160 | 2.4 | 170 | |
| 6 | 37.7 | 15.0 | 10.3 | 5.0 | 23.1 | 24.5 | 170 | 2.0 | 200 | |
| 7 | 39.5 | 17.1 | 12.1 | 5.8 | 20.0 | 20.2 | 185 | 2.0 | 220 | |
| 8 | 38.7 | 17.5 | 12.7 | 5.4 | 20.8 | 20.7 | 190 | 2.0 | 210 | |
| 9 | 41.5 | 19.3 | 12.9 | 6.1 | 21.5 | 22.0 | 175 | 1.7 | 230 | |
| 10 | 39.8 | 18.6 | 13.5 | 7.2 | 20.3 | 19.5 | 180 | 1.5 | 250 | |
| 11 | 42.0 | 19.8 | 15.2 | 7.3 | 22.1 | 18.7 | 195 | 1.8 | 270 | |
| 12 | 45.5 | 21.3 | 14.2 | 6.6 | 21.4 | 19.7 | 200 | 1.0 | 250 | |
| 13 | 40.7 | 20.6 | 13.0 | 6.1 | 19.6 | 18.2 | 250 | 1.0 | 250 | |
| 14 | 42.1 | 20.3 | 15.2 | 7.7 | 21.2 | 20.7 | 275 | 1.0 | 250 | |
| 15 | 43.8 | 21.0 | 14.1 | 7.0 | 22.3 | 20.6 | 270 | 1.0 | 265 | |
| 16 | 41.4 | 20.7 | 13.8 | 6.9 | 19.8 | 21.2 | 260 | 1.0 | 255 | |
| 17 | 42.7 | 24.1 | 13.8 | 6.0 | 20.7 | 25.4 | 245 | 1.2 | 240 | |
| 18 | 43.6 | 23.8 | 13.5 | 5.9 | 19.9 | 22.3 | 300 | 1.3 | 250 | |
| 19 | 45.0 | 21.7 | 12.1 | 5.8 | 21.5 | 19.6 | 270 | 1.8 | 270 | |
| 20 | 48.8 | 25.5 | 13.4 | 6.1 | 20.1 | 18.7 | 260 | 1.7 | 260 | |
| 21 | 45.1 | 21.4 | 15.7 | 7.3 | 22.3 | 19.2 | 280 | 1.0 | 230 | |
| 22 | 44.7 | 22.0 | 14.7 | 7.0 | 23.1 | 18.1 | 255 | 1.0 | 250 | |
| 23 | 46.1 | 23.4 | 14.8 | 7.1 | 23.2 | 19.9 | 325 | 1.5 | 240 | |
| 24 | 48.3 | 22.6 | 15.2 | 6.2 | 20.8 | 20.7 | 285 | 1.1 | 230 | |
| 25 | 47.7 | 25.3 | 14.3 | 7.4 | 24.5 | 22.1 | 205 | 1.2 | 230 | |
| 26 | 46.4 | 24.4 | 14.8 | 7.5 | 22.0 | 20.8 | 305 | 1.3 | 230 | |
| 27 | 47.3 | 21.9 | 14.7 | 7.6 | 17.2 | 16.0 | 275 | 1.7 | 250 | Sample according to the invention |
| 28 | 46.5 | 25.0 | 14.6 | 6.4 | 18.7 | 15.8 | 250 | 1.6 | 275 | |
| 29 | 45.2 | 24.3 | 15.6 | 8.0 | 16.2 | 18.8 | 280 | 1.9 | 270 | |
| 30 | 49.8 | 23.7 | 16.9 | 7.2 | 16.6 | 16.1 | 330 | 1.0 | 265 | |
| 31 | 48.7 | 26.0 | 15.5 | 6.9 | 15.0 | 17.3 | 325 | 1.0 | 240 | |
| 32 | 46.6 | 25.1 | 14.0 | 7.1 | 16.0 | 16.1 | 285 | 1.0 | 230 | |
| 33 | 49.2 | 23.8 | 15.2 | 7.0 | 17.8 | 18.4 | 270 | 1.2 | 270 | |
| 34 | 43.9 | 22.0 | 13.8 | 6.3 | 18.1 | 17.1 | 295 | 1.1 | 275 | |
| 35 | 48.0 | 25.6 | 13.3 | 6.3 | 20.8 | 18.6 | 260 | 1.7 | 260 | |
| 36 | 45.5 | 21.5 | 15.6 | 7.5 | 22.2 | 19.6 | 280 | 1.0 | 230 | |
| 37 | 44.2 | 22.5 | 14.4 | 7.2 | 23.5 | 18.7 | 255 | 1.0 | 250 | |
| 38 | 46.0 | 23.3 | 14.2 | 7.0 | 23.3 | 19.8 | 325 | 1.5 | 240 | |
| 39 | 48.1 | 22.2 | 15.1 | 6.0 | 20.3 | 20.2 | 285 | 1.1 | 230 | |
| 40 | 45.7 | 26.0 | 14.5 | 7.3 | 24.2 | 23.1 | 235 | 1.1 | 235 | |
| 41 | 43.8 | 24.5 | 14.5 | 7.4 | 23.0 | 20.9 | 320 | 1.2 | 235 | |
| 42 | 42.3 | 23.0 | 14.2 | 7.4 | 20.0 | 17.1 | 280 | 1.6 | 250 | |
| 43 | 46.6 | 25.4 | 14.4 | 6.2 | 18.3 | 15.4 | 250 | 1.6 | 275 | |
| 44 | 45.4 | 24.5 | 15.8 | 8.2 | 16.5 | 18.3 | 280 | 1.9 | 270 | |
| 45 | 49.0 | 23.8 | 16.9 | 8.0 | 16.8 | 16.8 | 330 | 1.0 | 265 | |
| 46 | 49.1 | 27.0 | 15.9 | 6.5 | 16.0 | 17.4 | 330 | 1.1 | 250 | |
| 47 | 48.1 | 25.3 | 14.2 | 8.2 | 18.1 | 17.1 | 290 | 1.0 | 255 | |
| 48 | 50.0 | 28.1 | 15.5 | 8.3 | 18.0 | 19.5 | 275 | 1.1 | 275 | |

TABLE 2-continued

| | Material characteristics | | | | | | Bearing performance | | | |
|---|---|---|---|---|---|---|---|---|---|---|
| | Hardness (in Hv) | | Tensile strength (in kg/mm²) | | Elongation (in %) | | Anti-seizure property (kg/cm²) | Abrasion-resistant property (mg) | Anti-fatigue property (Hrs) | |
| Sample No. | Normal temperature | 200° C. | Normal temperature | 200° C. | Normal temperature | 200° C. | | | | Remarks |
| 49 | 45.2 | 23.0 | 13.4 | 6.4 | 19.4 | 18.2 | 290 | 1.1 | 275 | |

It will be seen from these results that with Samples No. 6 to No. 49 the mechanical strength at high temperature (200° C.) was less reduced compared to contrast samples. This indicates improvement of the mechanical strength and elongation owing to spherical shape of the Si precipitate due to Sr and Sb.

To examine the anti-seizure property and abrasion-resistant property of the samples, tests were conducted by using friction and abrasion machine. The test conditions were as follows.

Frictional speed: 4 m/sec.
Counterpart member: S45C, hardness H, C=55, surface roughness 0.8 to 1.0S
Lubricant used: SAE, 20w–40
Lubricant temperature: 150±5° C.
Seizure load: The surface pressure was increased for every 15 minutes at an interval of 10 kg/cm² from 100 kg/cm². Seizure load is the surface pressure, with which seizure took place.
Abrasion-resistant property: The abrasion-resistant property was tested at 100 kg/cm² for 6 hours, and the subsequent change in weight was measured.

The results are shown in Table 2.

Samples No. 6 to No. 49 show satisfactory anti-seizure property and abrasion-resistant property compared to the contrast samples. Further, it will be seen that the surface performance is improved by addition of Sr and Al matrix reinforcement elements. It will be seen that the alloys according to the invention have excellent lubrication function.

Then, each sample was processed into the shape of a bearing, and fatigue test on the final bearing was conducted. The results are shown in Table 2. In this test, like the actual engine condition, the bearing is secured to a connecting rod, and an eccentric load is applied to the rotary shaft for duration test under the following conditions. The duration, during which the performance was maintained without seizure or rupture, was tested.

Surface pressure: 600 kgf/cm²
Revolving rate: 4,000 r.p.m
Counterpart material: FCD 70, roughness 0.8 to 1.5S
Lubricant used: SAE 20w–40
Lubricant temperature: 150° C.±5° C.

The upper limit of the test time was set to 300 hours. The average value for N=5 is shown in Table 2. With the samples according to the invention the duration time is long compared to that of the contrast examples. Thus, it will be seen that the invention has excellent anti-fatigue property.

Figure 6:
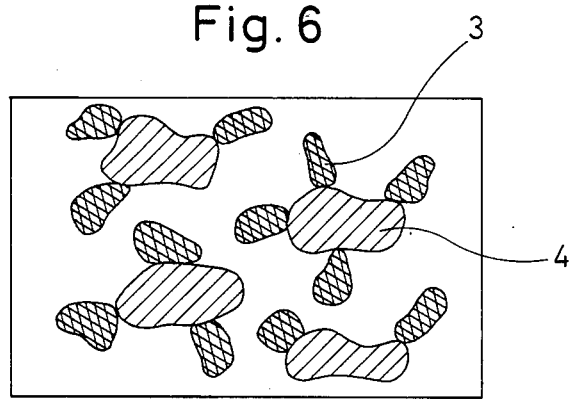
FIGS. 6 and 7 are views showing microscopic structure of a bearing alloy of the bearing material according to the invention as shown in FIG. 1.
Figure 7:
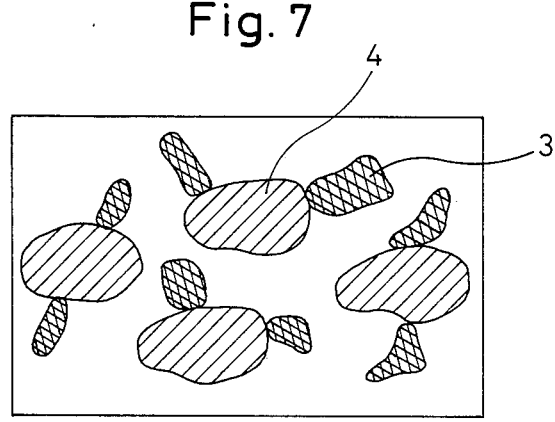
Figure 8:
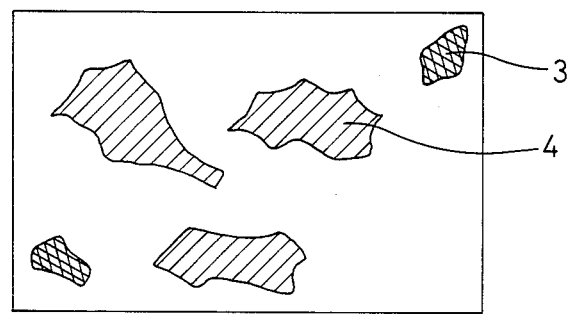
FIG. 8 is a view showing the microscopic structure of a bearing alloy of the prior art bearing material, as shown in FIG. 3.

Sample No. 7 was obtained by adding 0.03% of Sr to the alloy composition of Contrast Sample 2. The Si precipitate in this case is as shown in FIG. 6. The Si precipitate of Sample No. 36 containing 0.03% of Sb is as shown in FIG. 7. The Si precipitate of Contrast Sample No. 2 is as shown in FIG. 8. FIGS. 6 to 8 are microscopic photographs of the composition of the bearing alloys. The microscopic photograph of each sample was taken after deeply etching it until the shape of Si precipitate particles can be seen. As is apparent from FIGS. 6 and 7, with the samples containing Sr and SbSi precipitate particles 4 have spherical or rounded shape, and Sn-Pb alloy particles 3 are precipitated in the vicinity of the Si precipitate. In the contrast sample shown in FIG. 8, Si precipitate particles 11 have rod-like or flaky shape, and Sn-Pb alloy particles 3 are spaced apart from the Si precipitate.

EXAMPLE 2

Sample No. 34 containing Sr and Sample No. 49 containing Sb were tested to obtain impact value for comparison with Contrast Sample No. 5 (not containing Sr and Sb) shown in Table 1.

The test was carried out by forming and testing No. 3 test piece (n=5) according to Charpy impact test process indicated at JIS Z 2242.

With Contrast Sample No. 5 the average value was 0.84 kg·m/cm², with Sample No. 34 the average value was 3.12 kg·m/cm², and with Sample No. 49 the average value was 3.20 kg·m/cm². Obviously, improved effect can be recognized with the bearing alloys containing Sr and Sb according to the invention.

EXAMPLE 3

Table 3 shows samples according to the invention. In these samples, components are contained in the neighborhood of the upper and lower limits of the ranges according to the invention.

From each sample a forged billet was produced by the method as described before in connection with Example 1. The forged billet thus produced was press bonded to a backing metal to obtain a bearing material.

To confirm the effects of the invention contrast samples which contain neither Sr nor Sb were produced, and the effects according to the invention were observed by using a microscope.

With the samples containing Sr or Sb according to the invention the Si precipitate particles has round shape close to the sphere. It was confirmed that Sn-Pb alloy precipitate particles were found adjacent to the Si precipitate. It was thus confirmed that the effect according to the invention can be obtained within the content ranges according to the invention.

In this example, Cu was used as typical element.

TABLE 3

| | Composition (in % by weight), the balance being Al | | | | | |
|---|---|---|---|---|---|---|
| Sample No. | Sn | Pb | Si | Sr | Sb | Cu |
| 50 | 5 | 0.3 | 0.5 | 0.1 | — | 3.5 |
| 51 | 20 | 4 | 5 | 0.2 | — | 0.5 |
| 52 | 30 | 7 | 10 | 0.02 | — | 0.1 |
| 53 | 5 | 0.3 | 0.5 | — | 0.05 | 1 |
| 54 | 20 | 4 | 5 | — | 0.07 | 0.5 |
| 55 | 30 | 7 | 10 | — | 0.02 | 0.1 |

TABLE 3-continued

| Sample No. | Composition (in % by weight), the balance being Al | | | | | |
|---|---|---|---|---|---|---|
| | Sn | Pb | Si | Sr | Sb | Cu |
| 56 | 20 | 4 | 5 | 0.2 | 0.1 | 0.5 |

What is claimed is:

1. An aluminum alloy bearing material being constructed to have an aluminum alloy matrix consisting essentially of 3 to 35% of Sn, 0.5 to 10% of Si, 0.1 to 10% of Pb. 0.01 to 0.3% of Sr and 0.01 to 0.3% of Sb, the balance being substantially Al, said Si being dispersedly precipitated as silicon precipitate particles in the aluminum alloy matrix, characterized in that each of said silicon precipitate particles is precipitated in a spherical or oval shape, and provided with a rounded upper end portion projecting from a surface of said aluminum alloy matrix, and that in the neighborhood of said silicon precipitate particle there exists a Sn-Pb alloy precipitate particle, which is at least partly melted to form a liquid phase supplied onto a surface of said rounded upper end portion.

2. An aluminum alloy bearing material according to claim 1, which contains 0.3 to 3% in total of at least one member selected from the group consisting of copper, magnesium and zinc and 0.01 to 1.0% in total of at least one member selected from the group consisting of chromium, manganese, iron, nickel, copper, molybdenum, titanium, vanadium and zirconium.

3. An aluminum alloy bearing material according to claim 1, characterized in that said aluminum alloy matrix contains 0.1 to 4% in total of at least one member selected from the group consisting of Cu, Mg, Zn, Cr, Mn, Fe, Ni, Co, Mo, Ti, V and Zr.

4. A two-layer aluminum alloy bearing material comprising the aluminum alloy bearing material according to one of claims 2, 1 or 3 and a backing metal consisting of a steel sheet or a stainless steel sheet.

* * * * *